United States Patent [19]

Löliger et al.

[11] 3,884,746

[45] May 20, 1975

[54] WELDING APPARATUS FOR A PACKAGING MACHINE

[75] Inventors: Willi Löliger; Rudolf Schmied, both of Konolfingen, Switzerland

[73] Assignee: Alpura Koreco A.G., Konolfingen, Switzerland

[22] Filed: July 7, 1972

[21] Appl. No.: 269,523

[30] Foreign Application Priority Data

July 9, 1971 Switzerland...................... 10095/71

[52] U.S. Cl. ................ 156/466; 156/203; 156/497; 156/499
[51] Int. Cl............................................. B32b 31/20
[58] Field of Search ........... 156/203, 466, 497, 499, 156/465, 282, 306; 53/33, 39, 373; 93/77 R, 94 R, DIG. 1

[56] References Cited
UNITED STATES PATENTS

| | | | |
|---|---|---|---|
| 2,587,422 | 2/1952 | Wills................................. | 156/497 |
| 2,756,458 | 7/1956 | Krupp et al........................ | 156/203 |
| 2,979,114 | 4/1961 | Milne................................. | 156/203 |
| 3,340,678 | 9/1967 | Rhodes.............................. | 156/497 |
| 3,580,788 | 5/1971 | Gustafson.......................... | 156/466 |
| 3,633,333 | 1/1972 | Schlemmer et al................ | 53/373 |
| 3,720,565 | 3/1973 | Cavanna............................. | 53/373 |

*Primary Examiner*—Charles E. Van Horn
*Assistant Examiner*—Caleb Weston
*Attorney, Agent, or Firm*—Kenyon & Kenyon Reilly Carr & Chapin

[57] ABSTRACT

Welding apparatus for a packaging machine in which the longitudinal edges of a moving web or packaging material are welded for creating a flexible tube from which the finished packages are formed, in which hot air can be led into the gap between the longitudinal edges of the packaging material pre-formed into a flexible tube and provided with pressure-applying means for welding together the portions of the web extending along the longitudinal edges and heated by the hot air, in which there is a hood to bring up the hot air having an opening surrounded by wall portions and directed on to the portions of the flexible tube to be welded and whose wall portions are shaped in such a way that the opening is located in the immediate area of the external surface of the pre-formed flexible tube and with the opening in the hood extending at least over the side edges of the web to be welded in the peripheral direction of the flexible tube.

2 Claims, 4 Drawing Figures

PATENTED MAY 20 1975　　　　　　　　　　　　　　　3,884,746
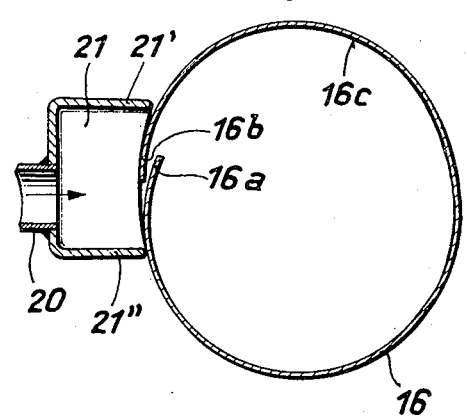
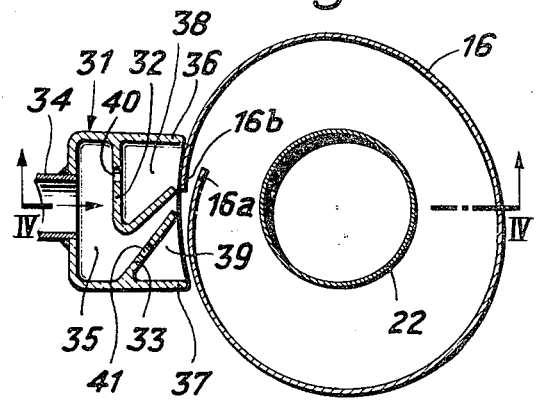
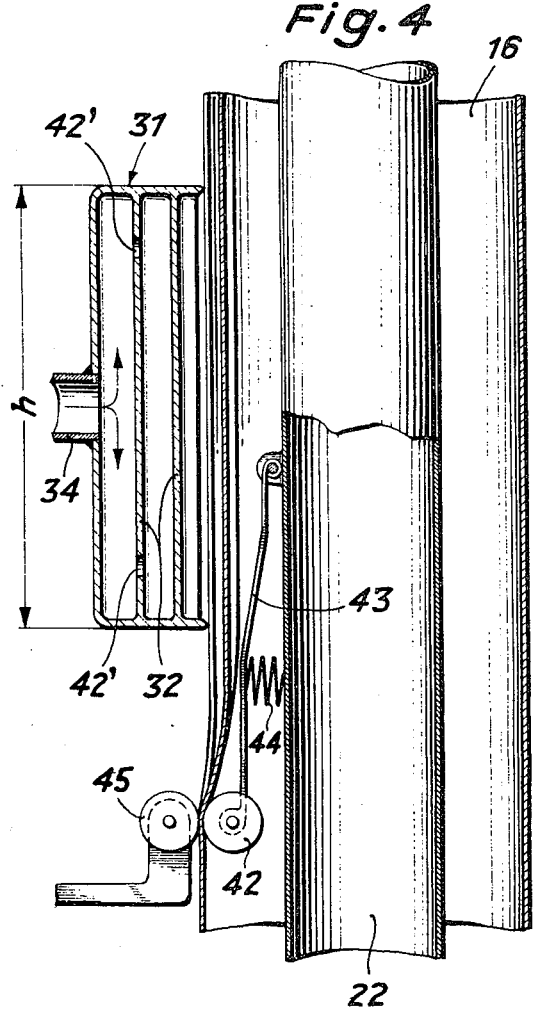
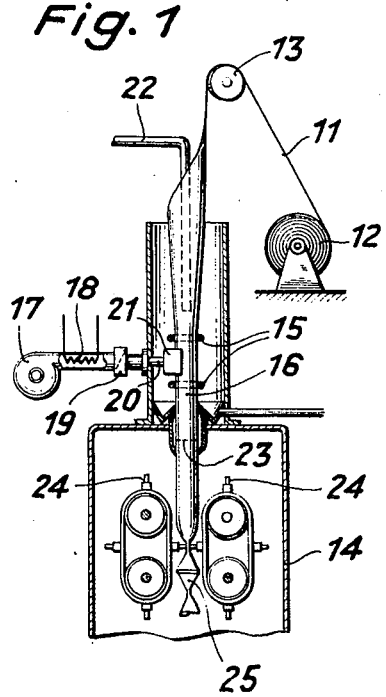

WELDING APPARATUS FOR A PACKAGING MACHINE

Packaging machines are known in which a flexible tube is formed from a plastics-coated moving web, the tube is filled with the contents to be packaged and is divided into individual filled packs by transverse welding. In order to form the webs, welding shoes which come to lie along the longitudinal edges to be welded have already been used. By electrical heating of the shoes, the plastics material softens and the pressure exerted by the welding shoes welds the sides of the web which is formed into a flexible tube.

Electrically heated welding shoes have the disadvantage that after a sudden shutdown of the machine, the heat stored therein can burn the packaging material. Also, it is difficult to obtain a high enough temperature for welding by heat conduction where thick packaging material is concerned. Hot air blown into the gap between the longitudinal edges of the packaging material, pre-formed into a flexible tube, has also been used to soften the plastics material ready for welding. It is then adequate to provide non-heated pressure-applying means underneath the point of heating to effect the welding together of the portions of the wall heated by the hot air. The hot air emerges through a nozzle which is directed on to the gap between the overlapping web portions.

The invention has as its aim the improvement of a hot-air welding apparatus. It has been found that in the known devices the jet of hot air emerging from the nozzle is cooled appreciably by an ejector-like effect on the surrounding air, reducing substantially the welding reliability. Also, it is not possible with the known arrangement to heat the external side of the web from outside; but the plastics material to be softened is located precisely on the inside of the web and thus cannot be heated uniformly over its entire depth.

The invention enables these drawbacks to be substantially eliminated. It is characterised by a hood serving to bring up the hot air and which communicates with the source of hot air and possesses an opening surrounded by wall portions and which, during operation of the apparatus, is directed on to the parts of the flexible tube to be welded together, and whose wall portions are formed in such a way that they are located in the immediate neighbourhood of the external surface of the preformed flexible tube, and in that in the peripheral direction of the flexible tube the hood opening extends at least over the welding region of the side edges of the web.

With the aid of the arrangement according to the invention admixing of cold surrounding air to the hot air is made practically impossible.

At the same time the sides of the web are heated also from the outside, and at least over the region to be welded, which contributes further to a reliable hermetic sealing together. An additional factor is a reduced requirement for hot air.

Suitably, the hood may be subdivided by partition walls extending in the direction of travel of the flexible tube. These partitions form a first chamber opening out in nozzle-like manner towards the gap between the longitudinal edges of the flexible tube and connected with the hot-air supply, and these partitions form additional side chambers together with the wall portions of the hood. Advantageously, these side chambers may be connected with the first chamber via openings in the partitions.

With this arrangement it is possible to direct a vigorous jet of hot air into the actual gap between the two sides of the web, while the side chambers make the access of surrounding air difficult. Connecting openings in the partitions leading to the first chamber allow access to hot air to give a heated zone of wider peripheral extent.

The invention and further associated features are described in greater detail in what follows by way of examples of embodiments illustrated in the drawing, in which:

FIG. 1 shows diagrammatically a packaging machine provided with the apparatus in accordance with the invention;

FIG. 2 shows an arrangement with a non-subdivided hood for hot air;

FIG. 3 shows an arrangement with a subdivided hood and a nozzle for hot air; and FIG. 4 shows a section taken on line IV — IV of FIG. 3.

In the arrangement according to FIG. 1 the paper web 11 coated on one side with plastics material is withdrawn from the supply roll 12 and led over the direction-changing roll 13. During descent into the packaging machine 14, the web 11 with the aid of a suitable means such as rings 15, is initially shaped into an open cylinder with overlapping edges and thereafter formed into a flexible tube 16 by welding of the edge of the web. Welding is performed with hot air which is aspired from the surroundings by the fan 17 and led into the welding hood 21 via the heater 18 and the line 20 after passing through the sterile filter 19. The flexible tube is filled to approximately the level 23 by a filling pipe 22 protruding into its interior and is subdivided in known manner with the aid of the revolving welding jaws 24. A further set of welding jaws (not shown) works in a plane at right angles to the plane off the drawing in such a way that the well-known tetrahedral packs 25 are formed.

FIG. 2 shows a cross-section of the flexible tube 16 with the edges 16a and 16b of the web. The welding hood 21 comes to lie against the tube approximately symmetrically relative to the welding zone extending in the direction of the axis of the tube. Together with its bottom and lid, wall portions 21' and 21" of the hood 21 form an opening directed towards the portion of the flexible tube 16 to be welded, the hood 21 being shaped in such a way that the opening is located in the immeditae area of the external surface of the pre-formed flexible tube 16 with the opening in the hood 21 extending at least over the side edges of the web to be welded in the peripheral direction of the flexible tube.

During operation hot air for example at 140°C is brought up to the flexible tube through the line 20 and the hood 21. A portion of the air flows through the gap between the two edges 16a and 16b of the web in contiguous relation into the tube interior, while another portion of the hot air flushes the portions of the tube wall facing the hood. In this way a uniform heating of the plastics material layer forming the interior 16c of the tube 16 can be obtained.

In the arrangement according to FIGS. 3 and 4 the hood 31 is subdivided by means of partitions 32 and 33 which form a first chamber 35 opening in nozzle-like manner towards the gap between the longitudinal edges 16a and 16b of the tube and communicating with the hot-air line 34. Together with the wall portions 36 and 37 the partitions 32 and 33 form additional side chambers 38 and 39, which are connected with the chamber 35 via openings 40 and 41 in the partitions 32 and 33 respectively. The filling pipe 22 is located in the interior of the tube 16 and at the same time serves as the tubular holder for the inner contact-making roll 42 mounted on the rocking lever 43 and pressed against the welding zone with the aid of the spring 44. The roll 42 collaborates with the external contact-making roll 45.

The opening in the hood 31 facing the flexible tube extends beyond the actual welding region in the peripheral direction of the flexible tube. The jet emerging from the chamber 35 heats the parts of the web intended to overlap, while the laterally adjoining portions are heated up by hot air passing through the openings 40, 41 and 42' at reduced speed. The height h of the welding hood depends on the speed of travel of the flexible tube, on the temperature of the hot air and also on the thickness of the coated paper web. It is necessary to keep the distance between the contact-making rolls 42 and 45 from the lower edge of the hood as small as possible.

The application in accordance with the invention is eminently suitable also for aseptically working packaging machines in which the web is supplied in the sterile state or in which the tube interior is sterilised above the level of the filled-in contents with the aid of a heater. Care must then be taken to see that the hot air is sterile.

We claim:

1. Welding apparatus for a packaging machine in which the longitudinal edges of a moving web of packaging material are welded for creating a flexible tube from which the finished packages are formed, in which hot air can be led into the gap between the longitudinal edges of the packaging material pre-formed into a flexible tube and provided with pressure-applying means for welding together the portions of the web extending along the longitudinal edges and heated by the hot air, characterized by a hood to bring up the hot air having an opening surrounded by wall portions and directed on to the portions of each edge of the flexible tube to be welded and whose wall portions are shaped in such a way that the opening is located in the immediate area of the external surface of the pre-formed flexible tube and with the opening in the hood extending at least over the side edges of the web to be welded in the peripheral direction of the flexible tube, said hood being subdivided by means of partitions extending in the direction of travel of the flexible tube, which partitions forms a chamber opening in nozzle-like manner towards the gap between the longitudinal edges of the flexible tube and communicating with the hot air supply, and in that together with the wall portions of the hood the partitions form additional side chambers.

2. Apparatus as claimed in claim 1, characterised in that the side chambers are connected with the first chamber by means of openings in the partitions.

* * * * *